United States Patent
Michel et al.

(12) United States Patent
(10) Patent No.: US 9,330,701 B1
(45) Date of Patent: May 3, 2016

(54) DYNAMIC TRACK MISREGISTRATION DEPENDENT ERROR SCANS

(71) Applicant: Seagate Technology LLC, Cupertino, CA (US)

(72) Inventors: Richard P Michel, Minneapolis, MN (US); Joshua W Christensen, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/571,270

(22) Filed: Dec. 15, 2014

(51) Int. Cl.
*G11B 5/596* (2006.01)
*G11B 20/18* (2006.01)

(52) U.S. Cl.
CPC ............ *G11B 5/59627* (2013.01); *G11B 20/18* (2013.01)

(58) Field of Classification Search
None
See application file for complete search history.

(56) References Cited

U.S. PATENT DOCUMENTS

| | | | | |
|---|---|---|---|---|
| 4,954,906 | A | * | 9/1990 | Nakamura et al. ......... 360/77.08 |
| 5,495,458 | A | * | 2/1996 | Ikeda et al. .................. 369/30.1 |
| 5,612,845 | A | * | 3/1997 | Smith ........................... 360/137 |
| 5,781,360 | A | | 7/1998 | Wilson et al. |
| 6,122,117 | A | * | 9/2000 | Aikawa ........................... 360/29 |
| 6,603,630 | B1 | * | 8/2003 | Gong et al. ................. 360/77.04 |
| 6,882,489 | B1 | * | 4/2005 | Brunnett et al. ................ 360/60 |
| 7,522,366 | B2 | | 4/2009 | Mettler et al. |
| 7,747,907 | B2 | | 6/2010 | Olds et al. |
| 7,974,029 | B2 | | 7/2011 | Tsai et al. |
| 8,023,215 | B1 | | 9/2011 | Ghaly et al. |
| 8,320,067 | B1 | | 11/2012 | Tsai et al. |
| 8,531,793 | B2 | | 9/2013 | Bandic et al. |
| 8,537,481 | B1 | | 9/2013 | Bandic et al. |
| 8,625,215 | B1 | | 1/2014 | Burd et al. |
| 8,736,995 | B1 | | 5/2014 | Wiesen et al. |
| 9,099,155 | B1 | * | 8/2015 | Kataria ................... G11B 27/36 |
| 2003/0128456 | A1 | * | 7/2003 | Shitara et al. .............. 360/77.07 |
| 2006/0066971 | A1 | | 3/2006 | Alex et al. |
| 2007/0127152 | A1 | * | 6/2007 | Suwa ......................... 360/77.08 |

OTHER PUBLICATIONS

US 8,625,228, 01/2014, Burd et al. (withdrawn)

* cited by examiner

*Primary Examiner* — Tan X Dinh
(74) *Attorney, Agent, or Firm* — Cesari & Reed, LLP; Kirk A. Cesari; Christian W. Best

(57) ABSTRACT

Systems and methods are disclosed for using track misregistration values, representing an amount of off-track deviation of a write element, to dynamically increment error scan counters for proximate storage areas. In certain embodiments, an apparatus may comprise a processor configured to perform a write operation to record data to a target track of a data storage medium using a write element, determine an amount of deviation of the write element from a center line of the target track, and increment an error scan counter for an area of the data storage medium proximate to the target track based on the amount of deviation.

20 Claims, 7 Drawing Sheets

DYNAMIC TRACK MISREGISTRATION DEPENDENT ERROR SCANS

SUMMARY

In certain embodiments, an apparatus may comprise a processor configured to perform a write operation to record data to a target track of a data storage medium using a write element, determine an amount of deviation of the write element from a center line of the target track, and increment an error scan counter for an area of the data storage medium proximate to the target track based on the amount of deviation.

In certain embodiments, a method may comprise performing a write operation to record data to a target track of a data storage medium using a write element, determining an amount of deviation of the write element from a center line of the target track, and incrementing an error scan counter for an area of the data storage medium proximate to the target track based on the amount of deviation.

In certain embodiments, a memory device may store instructions that, when executed, cause a processor to perform a method comprising performing a write operation to record data to a target track of a data storage medium using a write element, determining an amount of deviation of the write element from a center line of the target track, and incrementing an error scan counter for an area of the data storage medium proximate to the target track based on the amount of deviation.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that when executed cause a processor to perform the methods.

Figure 1:
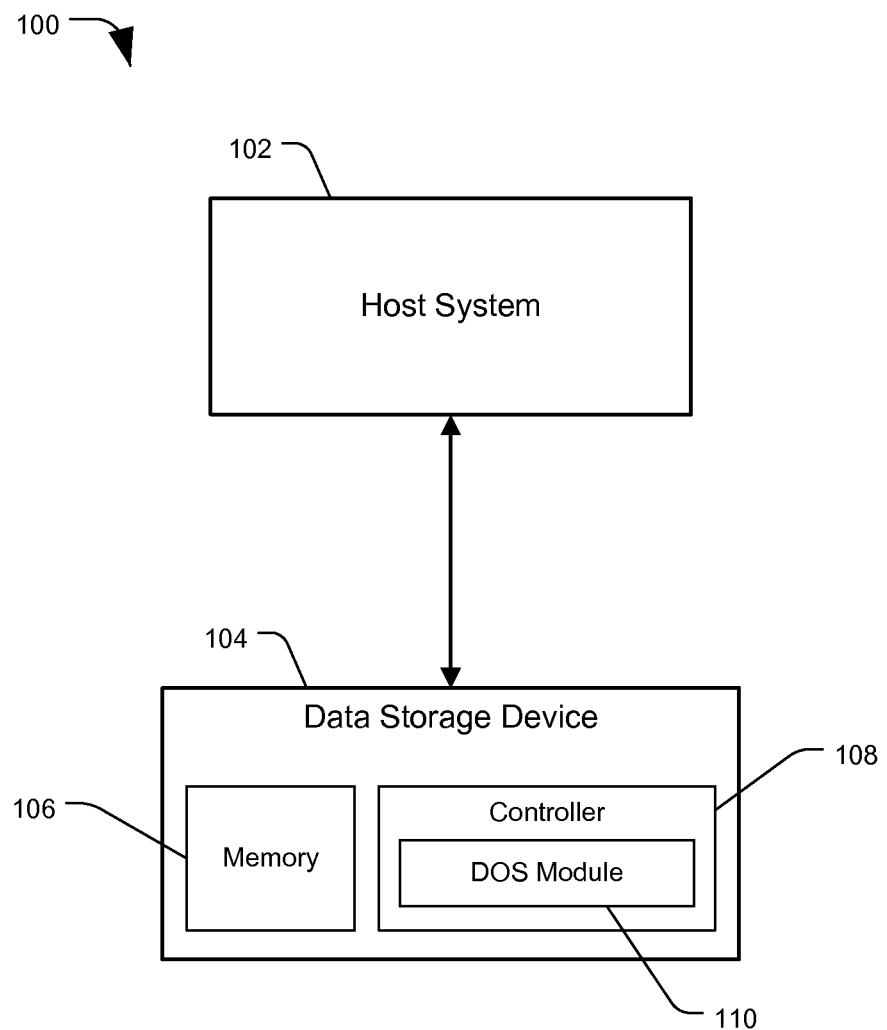
FIG. 1 is a diagram of a system employing dynamic track misregistration dependent error scans, in accordance with certain embodiments of the present disclosure.

FIG. 1 is a diagram of a system employing dynamic track misregistration dependent error scans, generally designated 100, in accordance with certain embodiments of the present disclosure. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive).

The DSD 104 may include a memory 106 and a controller 108. The memory 106 may comprise magnetic storage media such as disc drives, nonvolatile solid state memories such as Flash memory, other types of memory, or a combination thereof. The controller 108 may comprise a circuit or processor configured to control operations of the data storage device 104, such as storing data to or retrieving data from the memory 106. The DSD 104 may receive a data read or write request from the host device 102, and use the controller 108 to perform data operations on the memory 106 based on the request.

Data may be stored to memory 106, for example in units of data sectors. In some embodiments, data sectors may be referred to as LBAs (logical block addresses), based on the logical addresses used to reference the data stored to a data sector. For magnetic storage media drives, data may be recorded to a magnetic media, such as a disc, by using a read-write head or transducer head (sometimes referred to simply as a "head"). The head may include a reader element, or read head, to detect a magnetic charge of the magnetic media, which charge can be converted into data such as a stream of bits. The head may also include a writer element, or write head, which generates a magnetic field which can change the charge of the magnetic media, thereby storing data to the media. A disc media commonly includes a plurality of concentric circular data tracks, and each track may have a plurality of data sectors to which data can be stored.

During drive operation, data LBAs may accumulate degradation caused by stray fields produced by the write head during write operations on an adjacent track. For example, when recording data, the magnetic field of a writer element can impact the data stored on adjacent tracks to the target write track. It may be advantageous to periodically perform a directed offline scan (DOS), a type of error scan, for example by checking for data quality degradation on a track and rewriting that track if degradation is found. For example, error detection codes may be included with data sectors, which can be used by a DSD 104 to detect and correct errors that may arise during reading or writing data, or that may arise due to degradation from writes to nearby tracks.

Accordingly, DSD 104 may include DOS module 110. The DOS module 110 may be a processor, controller, or other circuit, or it may be a set of software instructions that, when executed by a processing device, perform the functions of the DOS module 110. In some embodiments, the DOS module 110 may be part of or executed by controller 108. The DOS module 110 may control a process of monitoring for potential degradation of a data track due to nearby writes, and initiating error detection and correction scans, such as DOS scans, based on potential accumulated degradation.

Figure 2:
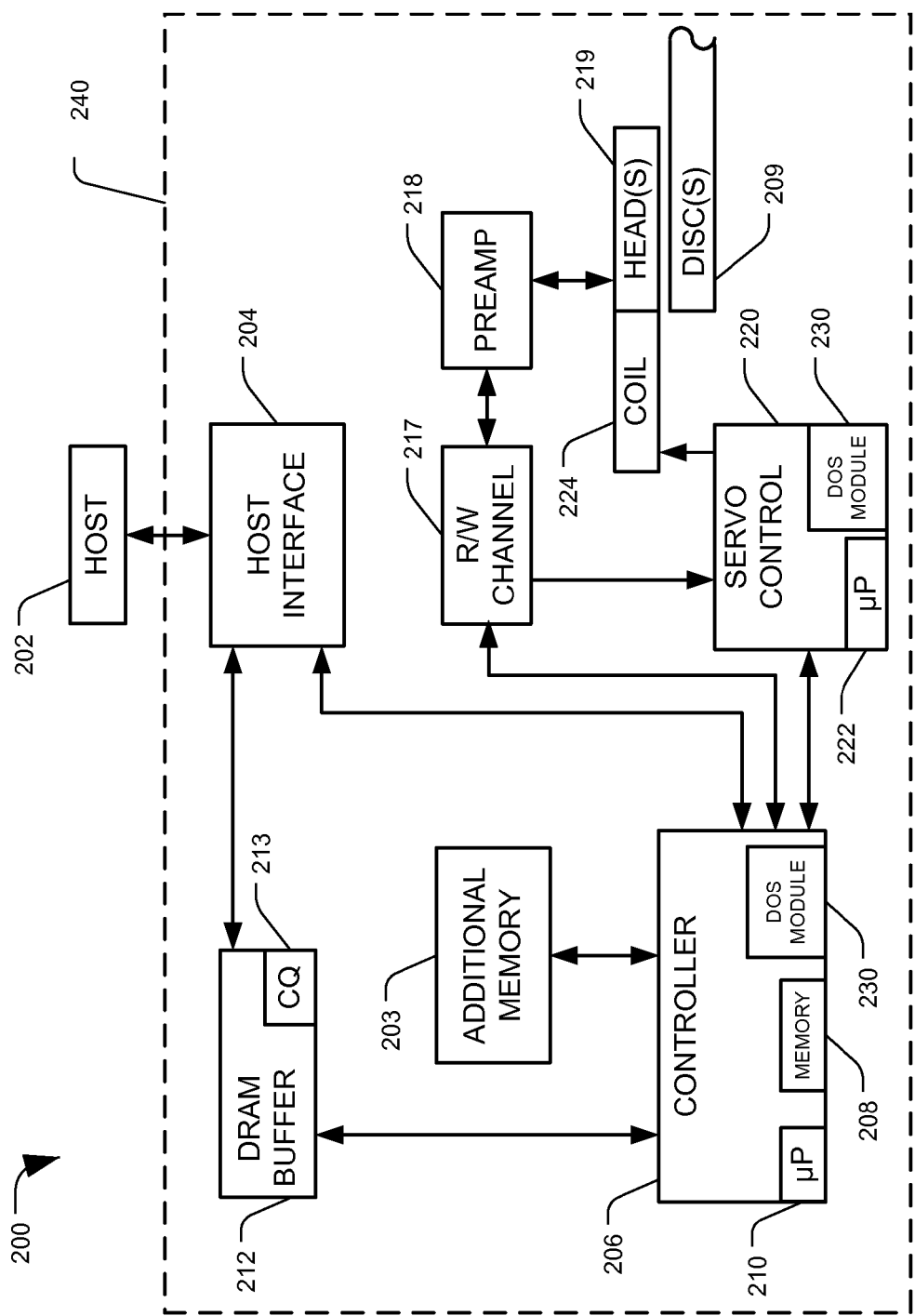
FIG. 2 is a diagram of a system employing dynamic track misregistration dependent error scans, in accordance with certain embodiments of the present disclosure.

FIG. 2 is a diagram of a system employing dynamic track misregistration dependent error scans, generally designated 200, in accordance with certain embodiments of the present disclosure. Specifically, FIG. 2 provides a functional block diagram of an example data storage device (DSD) 200. The DSD 200 may be a data storage device such as the device 104 shown in FIG. 1. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as Universal Serial Bus (USB), IEEE 1394 (Institute of Electrical and Electronics Engineers standard 1394), Compact Flash, Serial AT Attachment (SATA), external SATA (eSATA), Parallel ATA (PATA), Small Computer System Interface (SCSI), Serial Attached SCSI (SAS), Peripheral Component Interconnect Express (PCIe), Fibre Channel, Ethernet, or Thunderbolt, among others. The interface 204 may include a connector (not shown) that allows the DSD 200 to be physically removed from the host 202. In some embodiments, the DSD 200 may have a casing 240 housing the components of the DSD 200, or the components of the DSD 200 may be attached to the housing, or a combination thereof. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. In some embodiments, the DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of read-back signals. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213.

To read or write data to a storage medium such as disc(s) 209, a data storage device may employ servo data to properly position head 219 over a desired track. Servo data used to identify a head's location over a disc may be recorded onto disc(s) 209, interspersed between user data. Servo data may be read from disc(s) 209 by head 219 as the disc(s) spin and the head position is adjusted. The read servo data may be provided to preamp circuit 218. The preamp circuit 218 may preamplify and filter the readback signals from the transducer head 219, and provide the processed servo data to read/write channel 217. The R/W channel 217 can detect and condition the servo data, including application of automatic gain control (AGC) and conversion of the signals to digital form.

Servo control 220 can process the digitized servo data to generate a current command signal. The command signal may be used to apply the appropriate current to the coil 224 to position the transducer 219 over the disc(s) 209. The servo data may be used to determine a current track location of the head 219, and calculate adjustments to move to a target track, which may be called track seeking Once the head 219 is over a desired track, the servo data may be used to maintain the head's position over the track during read or write operations, which may be called track following. Due to various influences, such as vibration or jostling, a head 219 may not perfectly follow a target track center, which may lead to track misregistration (TMR). TMR may represent an amount of off-track deviation, or a deviation of the head from the target track center. The servo data may include burst signals, which may be called position error signal (PES) bursts. The PES bursts may be used to determine the PES value, representing an offset between a head's 219 current position and the track center. If a head 219 deviates too far from a desired track center during a write operation, a write fault may be declared and write operations may be suspended to avoid overwriting data on nearby tracks. The distance a head may deviate from the track center may be referred to as a write fault threshold (WFT).

In some embodiments, the DSD 200 may include solid state memory instead of or in addition to disc memory. For example, the DSD 200 can include an additional memory 203, which can be either volatile memory such as dynamic random-access memory (DRAM) or static random access memory (SRAM), or non-volatile memory, such as NAND Flash memory. The additional memory 203 can function as a cache and store recently or frequently read or written data, or data likely to be read soon. Additional memory 203 may also function as main storage instead of or in addition to disc(s) 209. A DSD 200 containing multiple types of nonvolatile storage mediums, such as a disc(s) 209 and Flash 203, may be referred to as a hybrid storage device.

DSD 200 may include a directed offline scan (DOS) module 230, which may correspond to DOS module 110 of FIG. 1. For example, the DOS module 230 may be a processor, controller, or other circuit, or it may be a set of software instructions that, when executed by a processing device, perform the functions of the DOS module 230. In some embodiments, the DOS module 230 may be part of or executed by controller 206, or part of or executed by servo control circuit 220. In some embodiments, the DOS module 230 may be included elsewhere in the DSD 200, such as in the R/W channel 217, or as a standalone component not included in another component. In some embodiments, the DOS module 230 may use the PES values detected during a write operation to determine an amount by which to increment DOS counters for areas of the disc 209.

DSD 200, for example using DOS module 230, may maintain DOS counters for designated regions of disc 209. The granularity of storage areas for which DOS counters are maintained may be balanced based on available memory and DSD 200 efficiency in not performing error scans too frequently.

For example, DOS counters may be maintained at a coarse level of granularity, such as for a zone including many concentric tracks. Every time a write is performed that may influence tracks within the zone, the DOS counter may be incremented. When a count threshold is reached, the entire zone may be scanned for errors and potentially refreshed. This would require very little memory to retain the DOS counters, but may result in performing error scans too frequently, or too late. For example, assume ten writes close to a given data sector normally requires the data sector to be refreshed. If the DOS count threshold for an entire zone is set to ten, scans may be performed much more often than is necessary, since ten writes are likely to be distributed around the zone and not affect the same location. However, if the threshold is set higher, e.g. to one hundred, there is a significant chance that ten or more of those writes may affect the same area and that data may be lost before the DOS scan is triggered.

In another example, DOS counters may be maintained at a fine level of granularity, such as based on every data sector. In such embodiment, the DOS counters may only be incremented when a particular data sector has been influenced by nearby writes, and individual sectors may be scanned when the count threshold is exceeded. This approach may produce very little operational overhead from performing unnecessary scans, and the counter is likely to be an accurate rating of an amount of degradation of each sector. However, keeping a counter for each data sector may be prohibitively expensive in memory overhead, and may require operational overhead in the form of tracking and updating so many counters.

Accordingly, it may be desirable to maintain counters for memory areas such as per track, per set of a small number of tracks (e.g. ten or less), per servo wedge portion of a track or a set of tracks, per a set number of data sectors, other areas, or a combination thereof. In some embodiments, if one of the designated areas is rewritten, either from a data refresh as part of an error scan, or because the area was written as part of a write command, the DOS counter may be reset. For example, if the DSD 200 stored DOS counters per track, and a write command is received from host 202 to rewrite a given track, the DOS counter for that track may be reset.

In some example embodiments, DOS module 230 may be integrated into the controller firmware (CFW), and the controller 206 may be configured to implement the CFW and perform operations as directed by the DOS module 230. For example, the CFW may direct the controller 206 to maintain an array of counters in DRAM 212 (e.g. one counter for each track), which may represent the degree of exposure each track has experienced to nearby writes. The counters may be incremented after each nearby write operation with an increment size determined by the separation or distance between the write location and the exposed track. Servo control 220 may serve as a client for the CFW. The CFW can issue commands to servo controller 220 to move head 219 to a target track and maintain position over the track. The CFW may issue the commands to write and read once the servo command to move is complete. Servo control 220 can interrupt write operations in progress when a fault is detected such as when PES exceeds the WFT. Servo control 220 may maintain a PES history for a write operation, representing the amount, direction, or both of TMR during the write operation. In some embodiments, the CFW may request the PES history after the write is complete from the servo control 220, and use it to modify the increment step size to the adjacent tracks' counters.

Figure 3:
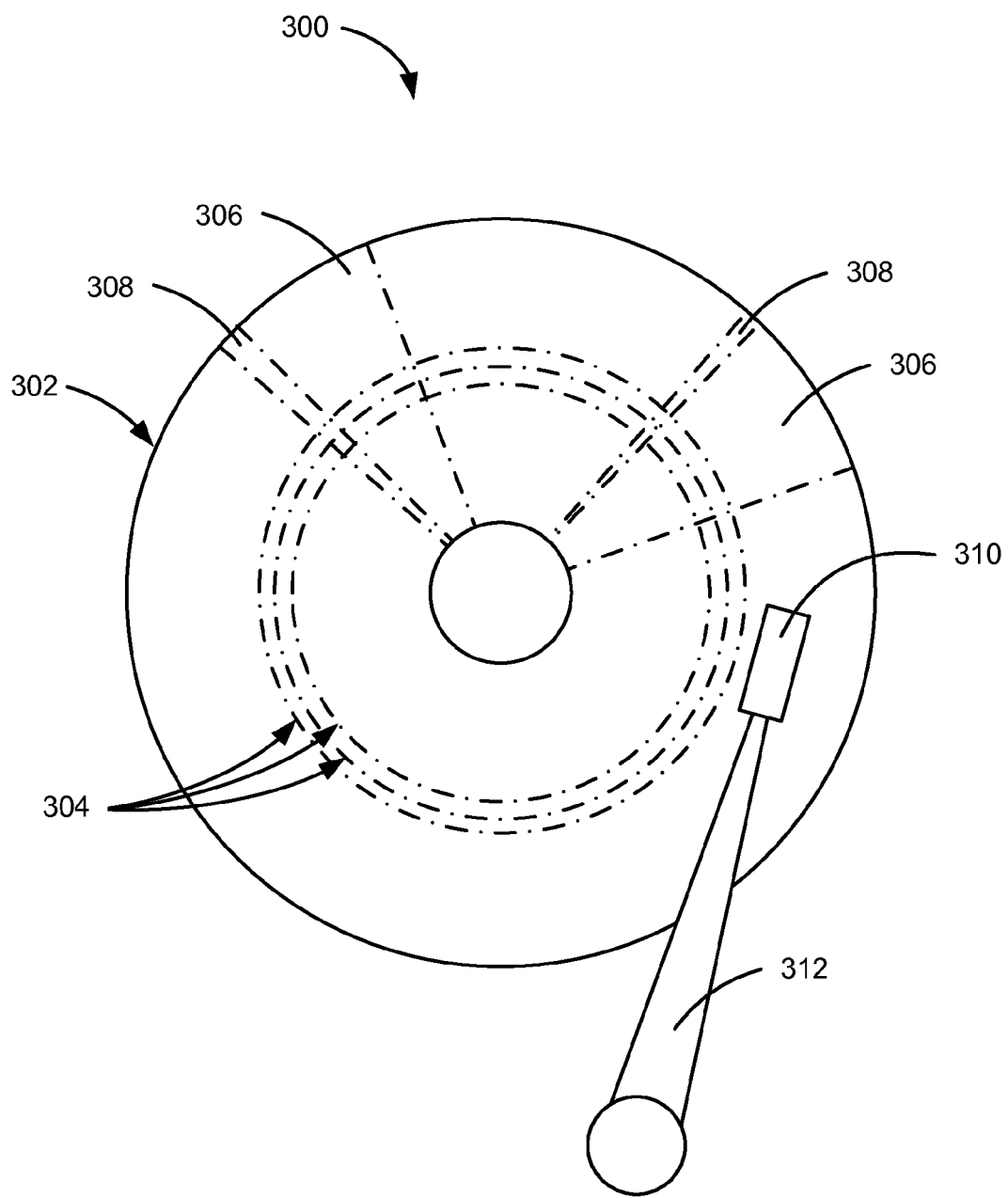
FIG. 3 is a diagram of a system employing dynamic track misregistration dependent error scans, in accordance with certain embodiments of the present disclosure.

FIG. 3 is a diagram of a system employing dynamic track misregistration dependent error scans, generally designated 300, in accordance with certain embodiments of the present disclosure. A data storage device, such as a hard disc drive, laptop computer, or other device, may have one or more discs 302 having tracks 304 for storing data. The tracks 304 may also be arranged on the disc 102 in a non-concentric pattern, such as in a spiral pattern. In some embodiments, a plurality of tracks may be grouped into a zone (e.g. an inner zone may contain all tracks near the inner diameter of the disc 302, an outer zone may contain all tracks near the outer diameter, and a middle zone may contain all tracks between the inner zone and the outer zone). Each track 304 may be further divided into a number of wedge-shaped servo sectors 306 (or servo wedge), and each servo sector 306 may be divided into a number of data sectors or LBAs for storing data along the length of the track 304. Data may be recorded to the data sectors of the tracks by a writer element of a head 310 (sometimes called a write head) generating a magnetic field, the magnetic field used to change the values of bits stored within the data sectors.

Specific data or locations on a disc 302 can be identified with a sector identification ("sector ID") or sector number, and a track identification ("track ID") or track address. This sector ID and track ID can be part of the servo data used to position an arm 312 having the read/write head 310 over a target track 304 of the disc 302. A section 308 (sometimes called a servo spoke) of each servo sector 306 may be devoted to store servo data, while the remainder of the servo wedge 306 may be used to store other data, such as user or system data. Similarly, each data sector may include servo data used for fine head positioning over the center of the target track, such as servo burst patterns. During operation, as the disc 302 spins, the head 310 can read the servo data 308 and use such data to move the arm 312 to position the head 310 over specific tracks 304. The data storage device may then read or write data to the target track 304 via the head 310.

In some embodiments, TMR may be determined at the granularity of the servo spoke 308, e.g., measured as the head 310 passes over servo data 308 and used for the following servo sector 306. The PES value may not be known or recorded for the area in-between servo data spokes 308, where user data may be recorded, even though the head off-track position may evolve between spokes. In an example implementation, DOS counters may be incremented based on a worst-case assumption, such as by using the worst servo spoke 308 TMR value of a write to a track 304 to determine the amount to increment the DOS counter for nearby tracks. In some embodiments, DOS counts may be maintained for each servo wedge 306 of a track 304, and the TMR values of writes to nearby servo wedges 306 may be applied directly without applying a worst-case assumption. In some embodiments, an entire track 304 may be refreshed or scanned if the DOS count of any one servo wedge 306 of the track reaches a DOS count threshold. For example, it may be more efficient to refresh an entire track than to refresh one servo wedge 306 at a time.

Figure 4:
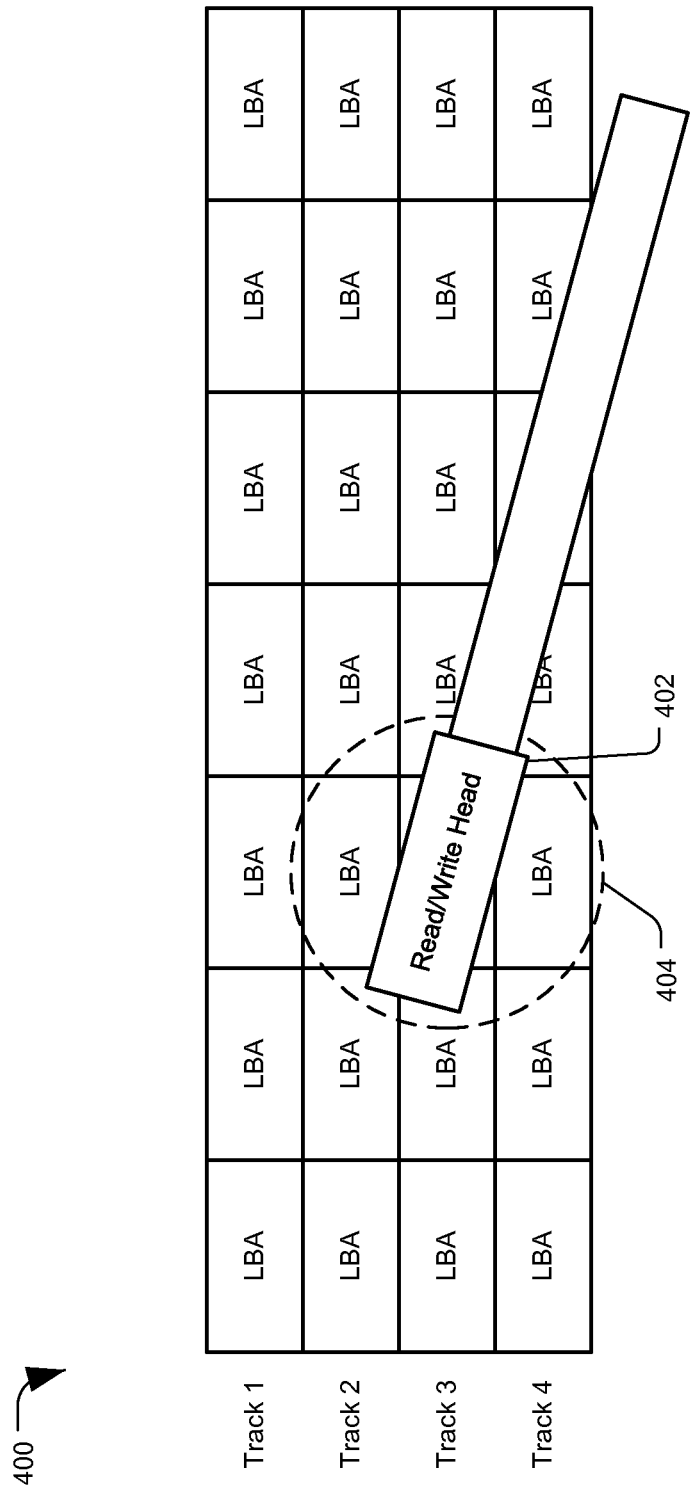
FIG. 4 is a diagram of a system employing dynamic track misregistration dependent error scans, in accordance with certain embodiments of the present disclosure.

Turning now to FIG. 4, a diagram of a system employing dynamic track misregistration dependent error scans is shown and generally designated 400, in accordance with certain embodiments of the present disclosure. FIG. 4 depicts a portion of four consecutive tracks, labeled Track 1 through Track 4. Each track may include a plurality of data sectors or LBAs, each of which may be used to store a block of data. A read-write head 402 may be used to read data from or store data to the LBAs. In the depicted embodiment, head 401 may be positioned over track 3 to perform write operations.

As disc drive areal density increases, achieving the desired data reliability at a target track spacing becomes more challenging due to encroachment of a magnetic field 404 created by the writer element in the head 402. The magnetic field 404 may be used to record data to the LBAs by changing the magnetic charge of the disc within the area of the LBA.

However, due to imperfections in the write head, high track densities on a disc, or other factors, the magnetic field 404 may extend beyond the track being written to influence proximate tracks (e.g. track 2 and track 4). Areas proximate to write location may be areas influenced or degraded by a nearby write operation.

When a drive performs repeated writes at the same location, the stray field generated by write field imperfections may result in a gradual erasure of nearby tracks, due to effects such as adjacent track interference (ATI) or side track erasure (STE). ATI may refer to the stray field 404 of a write head 402 affecting tracks adjacent to the target write track. STE may refer to flaws in the write head's 402 shape causing erasure to more distant tracks. For example, even though the magnetic field 404 is depicted as a circle, in some embodiments the field 404 may take different shapes and have different influences on nearby tracks. In order to mitigate these erasure effects, tracks can be periodically refreshed (e.g. rewritten).

A drive may maintain a count, sometimes called a DOS count or counter, for an area of a disc representing an amount of influence from nearby writes that the area has been exposed to. For example, the drive may maintain a count for each track, for a section of a track, for a group of tracks, other areas, or any combination thereof.

Refreshing a track (or other area) can be accomplished by performing a directed offline scan (DOS), or similar error detection and correction operation, on the track once the count for that area exceeds a threshold number. A DOS may involve reading the track, for example with a reader element of the head 402, using a lower error correction tolerance than during normal read operations. When data is read during normal read operations, some specified number of errors can be detected and corrected. For example, a number of errors which may be corrected may depend on the type of error correction codes and algorithms employed. An error tolerance may indicate a number of acceptable errors which can be corrected. By reading tracks using a lower error tolerance, degradation of the data on a track can be detected before the data becomes unreadable at the normal error correction tolerance.

If the track is still readable with the lower tolerance, the data quality for the track may not have degraded enough to warrant rewriting. If the track produces errors exceeding the lower error tolerance, the DOS may involve reading the track and applying error correction techniques, then rewriting the track to refresh the data quality. Performing DOS scanning and rewriting requires drive resources, so it may be beneficial to a drive's performance to increment the DOS counter for an area only by an amount that accurately reflects the likely influence of nearby writes on the area.

The rate of degradation for an area of a disc may be approximately linear with the log of the number of repeat writes as long as the distance between the written LBA (e.g. the "aggressor") and the affected LBA (e.g. the "victim") is constant. The rate of degradation can increase if the aggressor write is closer to the victim LBA. The relation of ATI to track spacing can greatly influence a possible track density of a disc, and accordingly the total storage capacity of a drive. If tracks are placed too close together, data integrity may become unreliable due to the influence of the magnetic field of writes to nearby tracks.

The fact that degradation can increase the closer an aggressor write is to a victim area may mean that a write to track 3 will have a greater influence on track 2 than on the more distant track 1. For example, when writing to track 3, a drive may increment a DOS count for track 2 by four, and increment the DOS count for track 1 by only one. In addition, however, a write to track 3 may have differing amounts of influence on track 2, depending on the position of the head 402 over track 3 while performing the write.

Track misregistration (TMR) can involve misalignment of a transducer with a given track. TMR errors can arise from a number of factors, including operational aspects of the recording subsystem or the servo-mechanical control system. TMR can also arise from effects external to the recording system, such as due to externally generated vibrations from moving the storage device, playing music on a connected host, or other factors. Accordingly, when performing a write operation to track 3 using head 402, the head 402 may actually stray more towards track 2, or more towards track 4, thereby causing magnetic field 404 to influence the adjacent tracks to a greater or lesser degree.

Figure 5:
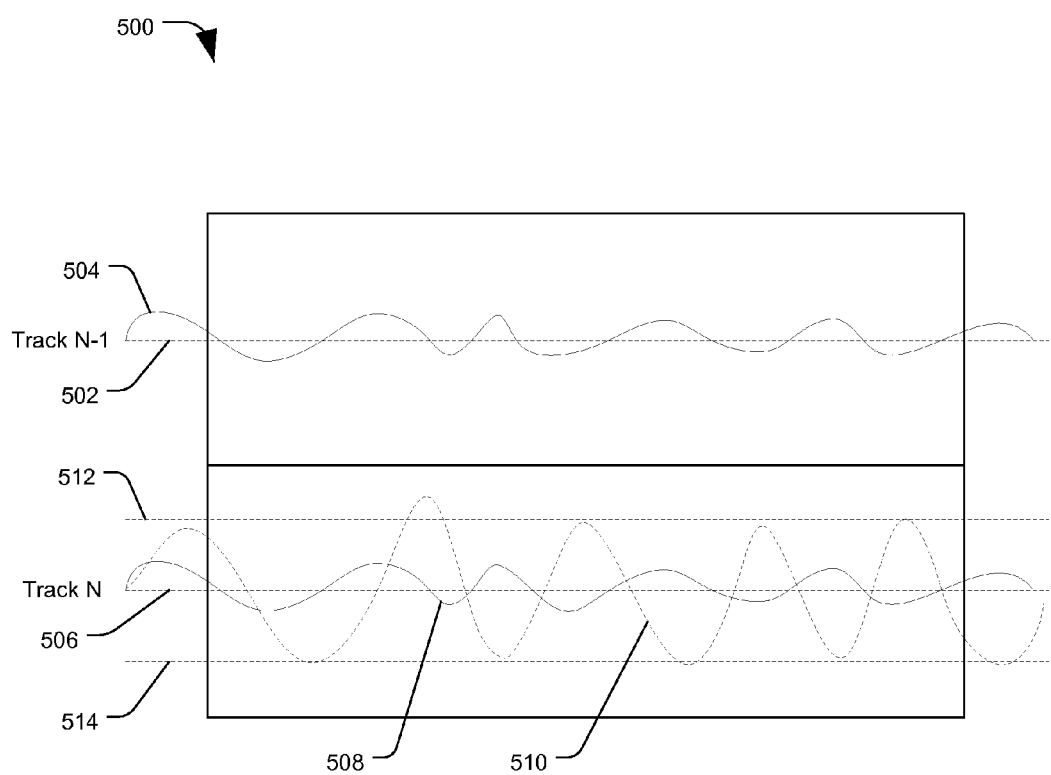
FIG. 5 is a diagram of a system employing dynamic track misregistration dependent error scans, in accordance with certain embodiments of the present disclosure.

FIG. 5 is a diagram of a system employing dynamic track misregistration dependent error scans, generally designated 500, in accordance with certain embodiments of the present disclosure. FIG. 5 depicts two adjacent tracks, track N−1 and track N. Track N−1 may have an ideal write center line 502, and data 504 written to track N−1 during normal operating conditions (e.g. no vibrations or other affects that may cause a transducer head to waver erratically). Adjacent to track N−1 may be track N, having a write center line 506. Track N depicts a write path 508 during normal operating conditions, and a write path 510 during conditions which may result in track misregistration (TMR). In order to prevent TMR from causing data recorded to tracks adjacent to track N to become difficult or impossible to read, write fault thresholds (WFTs) may be used to control data recording operations to track N. Write fault thresholds 512 and 514 may prevent writing if the write head deviates from center line 506 by more than a set amount, e.g. 15% of the track pitch (TP) for track N. Accordingly, if the write head moves away from the track N center line by more than 15% of track pitch, the write operation may be suspended to prevent data loss in adjacent tracks. This means that the write head position can still vary between 15% TP towards track N−1, and 15% TP towards track N+1, for example, while performing a write operation. The degradation to track N−1 from a write to track N may be substantially different if the write head was at 13% TP towards track N−1 than if the head was at 5% TP towards track N+1.

In some embodiments, a write head may be tested to determine an amount of influence that head may produce on nearby tracks during a write operation. Due to minute differences in head shapes, different heads may produce magnetic fields with different characteristics, and accordingly may have different degrees of influence on nearby tracks when performing a write operation. A disc drive may include multiple discs (e.g., a platter of three or more discs) and multiple heads (e.g., a head for each surface of each disc).

A value by which to increase the DOS count for nearby tracks may be determined by head testing. For example, during factory testing head A and head B may be used to perform repeated write operations on a test track, and the influence on those write operations on nearby tracks may be analyzed. It may be determined that head A has minimal impact on adjacent tracks, and accordingly a nominal DOS count increment value for head A may be set to one. Each time a write operation is performed by head A, the system may increment the DOS count for immediately adjacent tracks by the nominal value of one, and farther tracks may not have their DOS counts incremented at all. Head B may be determined to have significantly more influence on adjacent tracks, and may be designated with a nominal DOS count increment value of seven. Each time a write operation is performed by head B, the system may increment the DOS count for immediately adjacent tracks by the nominal value of seven, and the next farthest contiguous track by a nominal value of 4, and the next farther contiguous track by the nominal value of 1. When the DOS counter of a track reaches a set threshold (e.g. a value greater than thirty), the track may be scanned for errors and refreshed if necessary. In effect, areas influenced by head B with its higher erasure influence may require a greater number of DOS scans. Other embodiments and configurations are also possible. For example, a given head may be designated nominal values that may result in immediately adjacent tracks being scanned after sixteen write operations, while tracks that are ten tracks distant from the written track may reach the scan threshold after 260 writes.

The count increment value for each head may be stored as a parameter value in a read-write adaptive parameter (RAP) file or table stored to a memory of the drive. For example, the RAP file may be stored to a nonvolatile memory, and may be loaded into RAM during drive operation. The drive, e.g. using a DOS module, may consult the RAP file to determine how much to increment DOS counters after a write operation. However, in some embodiments, the increment values may be determined based on testing where the head is unlikely to deviate substantially from the center of the test track. However, the amount of TMR of the head during a write operation may substantially influence the amount of degradation of nearby tracks. Accordingly, the DOS increment values for each head applied to an influenced track may be dynamically adjusted based on the amount of head TMR (e.g. based on detected position error signals during the write operation).

Figure 6A:
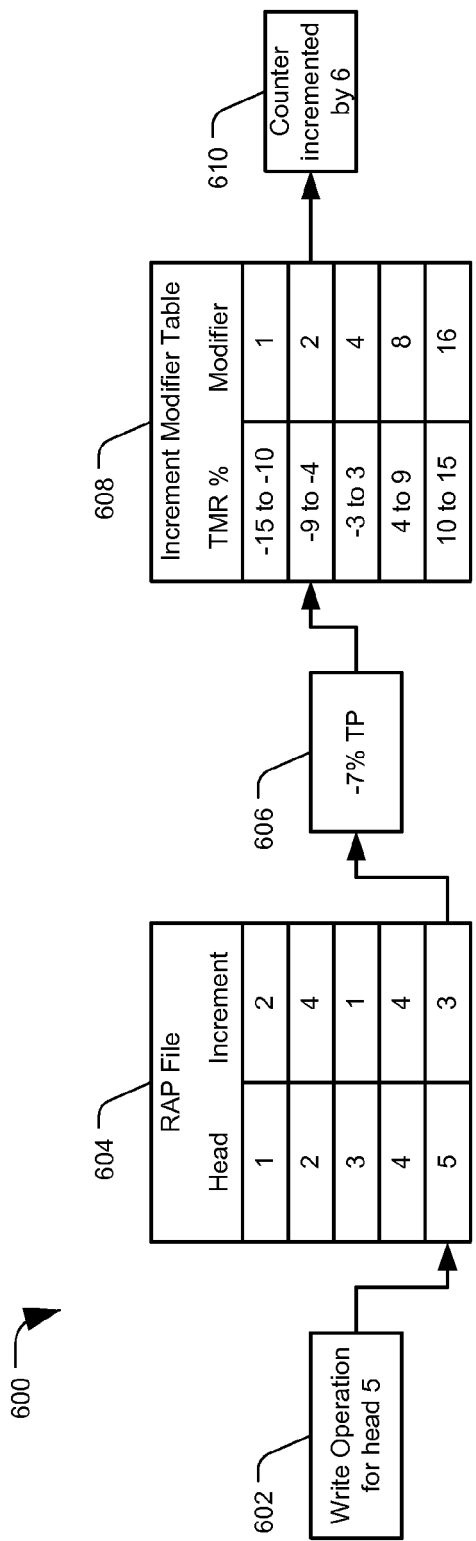
FIGS. 6A and 6B are a diagrams of a system employing dynamic track misregistration dependent error scans, in accordance with certain embodiments of the present disclosure.

FIG. 6A is a diagram of a system employing dynamic track misregistration dependent error scans, generally designated 600, in accordance with certain embodiments of the present disclosure. Diagram 600 depicts an example process for determining an amount to increment a DOS counter based on a write operation. A write command may be received, which is written using head 5 of a disc drive, at 602. A DOS module of the drive may consult a RAP file 604 to determine the nominal increment value for head 5. RAP file 604 is depicted having information for five heads, numbered 1 through 5, and a corresponding nominal increment value for DOS counters when performing writes with the given head. The nominal increment value for head 5 is determined to be the value 3.

During the write operation, the TMR amount may be determined based on position error signals detected during the write operation. The determined TMR amount may be compared to an increment modifier table 608, which may include values by which to modify the nominal increment amounts from RAP file 604. For example, TMR values may be categorized into TMR ranges, and each range may have a corresponding modifier to the nominal increment values. In the examples provided, TMR values may be shown as positive or negative, which may be in relation to the memory area for which the DOS counter is being incremented, the "affected area." A negative TMR may mean the write head deviated from the target write track center in a direction away from the affected area (and hence the affected area may be less influenced by the magnetic field), and a positive TMR may mean the write head deviated from the track center in a direction toward the affected area (and hence the affected area may be more influenced by the magnetic field). Accordingly, negative TMR values may have corresponding low modifiers to minimize the amount a counter is incremented, while positive TMR values may have high modifiers to magnify the amount by which a counter is incremented.

However, it should be understood that TMR values may be represented and implemented in other ways. For example, deviation towards the outer diameter (OD) of a disc may be defined as negative PES values, and deviation towards the inner diameter (ID) as positive PES values. Different implementations of tracking TMR and PES values, and using those values to modify increment values, should be apparent to those skilled in the art.

In an example embodiment, when writing to a given target track 4, the TMR may be determined to be −7% of the Track Pitch (TP), at 606. The DOS module may determine that a TMR of −7% TP falls into the range of −9 to −4 from increment modifier table 608, has a modifier of 2. In an example embodiment, head 5's nominal increment value of 3 may be multiplied by the modifier of 2 to obtain the increment value to apply to an adjacent track 3. That is, the DOS counter for track 3 may be incremented by (3*2)=6.

Figure 6B:
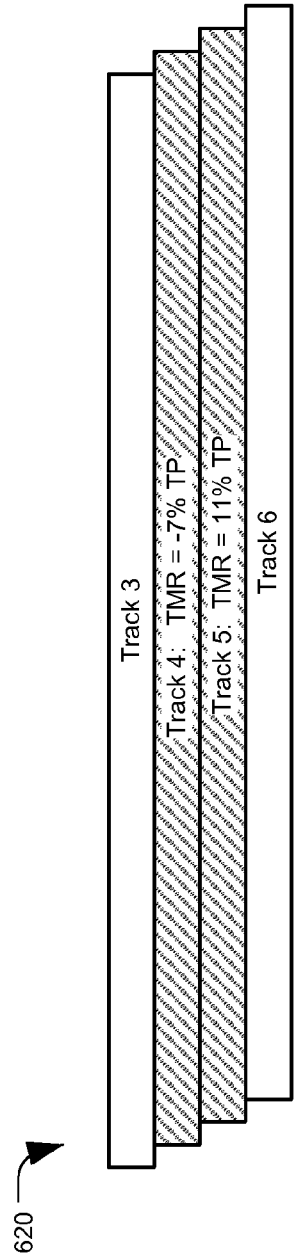

FIG. 6B is a diagram of a set of tracks 620 reflecting a write operation as in FIG. 6A. The write command for head 5 may include writing tracks 4 and 5, as indicated by the hashed lines. Adjacent tracks 3 and 6 may be tracks affected by ATI from the write operation. As described above, during the write to track 4, the write head may have deviated from the track 4 center line away from track 3 by −7% TP, and the increment value for track 3 may accordingly have a low multiplier of 2. During the write to track 5, the write head may have deviated away from the track 5 center line towards track 6 by 11% TP. For determining an amount to increment the DOS counter for track 6, the DOS module may take the head 5 nominal value (3), multiplied by the modifier for 11% TP (16), to obtain an increment value of 48.

It should be understood that the examples of FIG. 6A and FIG. 6B are just one embodiment, and other equations and implementations may be used. For example, nominal increment values may not be reduced for TMR values of less than 0, with TMR values of 0 or less resulting in applying the nominal increment value. In some embodiments, different increment values or modifier values may be employed, different TMR ranges may be used, or other changes may be made. For example, one or more TMR thresholds may be used to determine a modifier instead of TMR ranges. In another example, increment values may be determined not only for immediately adjacent tracks, but also more distant tracks. An additional step may be added to reduce the increment value in relation to a number of tracks distant that an affected track is from the written track (e.g. by dividing the increment value by the number of tracks the affected track is from the written track). In some embodiments, the TMR modifiers may only apply for an immediately adjacent affected track, and more distant tracks may not have modifiers applied. In some embodiments, the RAP file may store different nominal increment values for each direction relative to the write head. For example, a write head may have a greater influence in one direction (e.g. toward the outer diameter OD of the disc) than in the other direction (e.g. toward the inner diameter ID of the disc). So for a write to track 3, the nominal increment value for track 2 may be 5, while the nominal increment value for track 4 may be 1. Other embodiments are also possible.

Figure 7:
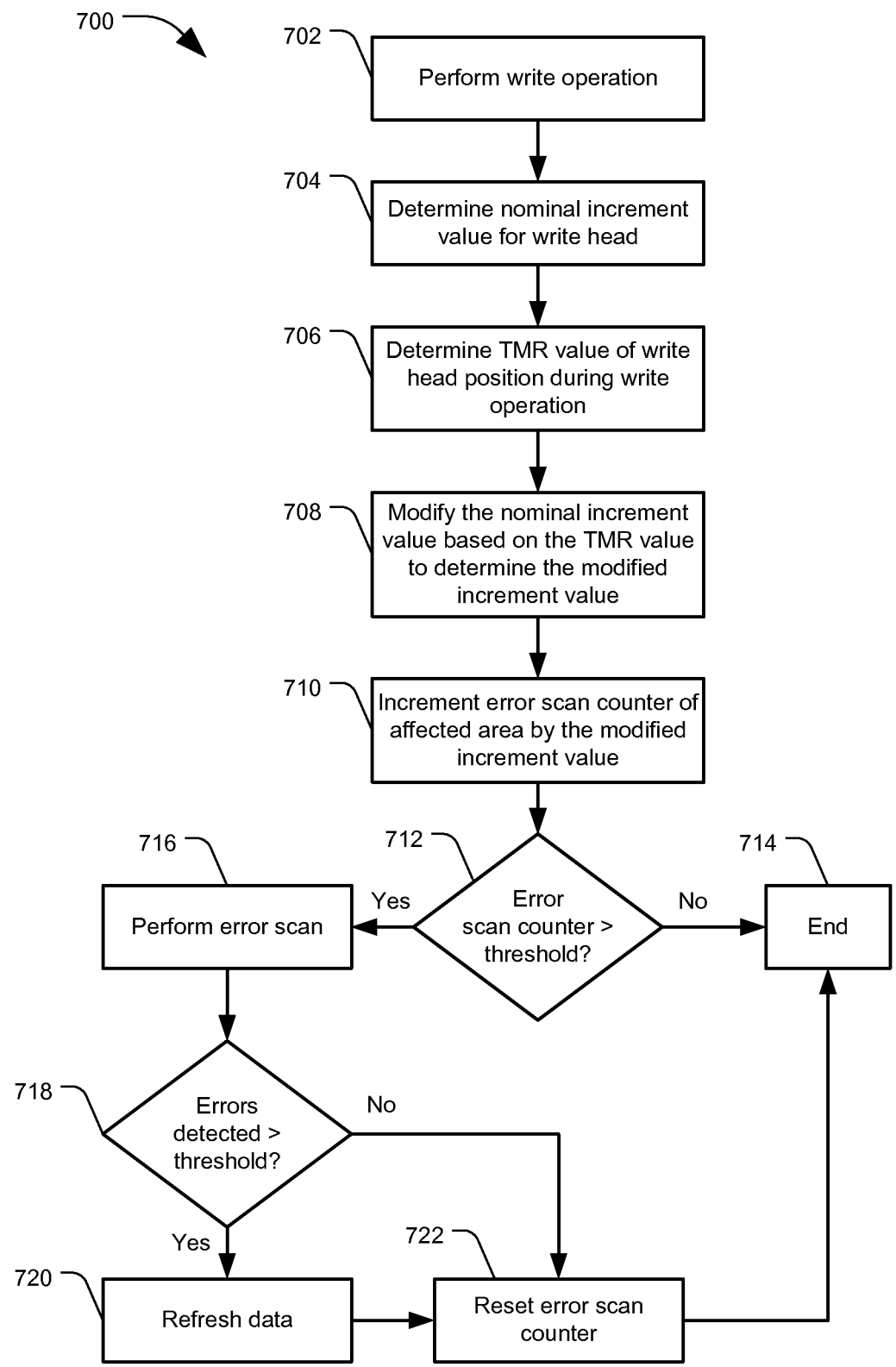
FIG. 7 is a flowchart of a method for dynamic track misregistration dependent error scans, in accordance with certain embodiments of the present disclosure.

FIG. 7 is a flowchart of a method 700 for dynamic track misregistration dependent error scans, in accordance with certain embodiments of the present disclosure. Method 700 may include performing a write operation, at 702. For example, a data storage device (DSD) may receive a write command from a host device, or the DSD may store system data such as address mapping information to a disc memory. The method 700 may include determining a nominal increment value for the write head involved in the write operation, at 704. In some embodiments, a DSD may have multiple heads, and the write head to be used in the write operation may be determined. In an example, the DSD may look up the write head of the write operation in a read-write adaptive parameter (RAP) file, and determine the corresponding nominal increment value.

During the write operation, method 700 may include determining a track misregistration (TMR) value of the write head positioning during the write operation, at 706. For example, during a write operation the head's read element may detect burst patterns recorded to the disc to determine a position error signal (PES), which may indicate how far from the track center the write element is located. In some embodiments, the TMR value may be represented as a percentage of track pitch (TP).

At 708, method 700 may include modifying the nominal increment value determined at 704 based on the TMR value determined at 706 to determine the modified increment value. For example, increment value modifiers may be stored to the DSD based on ranges of TMR values. For example, the more the write head deviates from the track center toward an adjacent track, the greater an influence the write operation may have on that adjacent track, and the larger the modifier may be. There may be multiple TMR thresholds corresponding to different modifier values.

Method 700 may include incrementing an error scan counter of an area affected by the write by the modified increment value, at 710. For example, if the nominal increment value is three, and the modifier is ten, the modified increment value may be thirty, and a track adjacent to the written track may have its error scan counter incremented by thirty.

The method 700 may include determining whether the error scan counter of the affected area is greater than an error scan threshold, at 712. If not, the method may end at 714. If the error scan counter is greater than the error scan threshold, at 712, the method may include performing an error scan on the affected area, at 716. For example, the DSD may perform a directed offline scan (DOS) including reading data from the affected area with a lower error tolerance than the DSD is capable of correcting, to determine if the stored data is degraded. If the quantity of detected errors is greater than the error threshold of the lower error tolerance, at 718, the method may include refreshing the data, at 720. Refreshing the data may include correcting the detected errors and re-recording the data to the affected area. If the quantity of detected errors is not greater than the error threshold, at 718, or after refreshing the data at 720, the method may include resetting the error scan counter, at 722. The method may then end, at 714.

In some embodiments, method 700 may be repeated for additional affected areas. For example, affected areas on both sides of the target write area may have error scan counters incremented, potentially by differing amounts. In some embodiments, more distant tracks or other areas may also have error scan counts incremented. For example, an additional modifier for the increment value may be used to reduce the increment value for more distant tracks that may be less affected by ATI. Other embodiments are also possible.

By dynamically scaling the DOS count increment values based on TMR, a drive can more accurately determine when to perform error scans and thereby increase data reliability. By improving data reliability, a number of tracks per inch (TPI) other recording density parameters may be increased, allowing for higher areal density capability (ADC) of storage devices.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a processor configured to:
   perform a write operation to record data to a target track of a data storage medium using a write element;
   determine an amount of deviation of the write element from a center line of the target track; and
   increment an error scan counter for an area of the data storage medium proximate to the target track based on the amount of deviation.

2. The apparatus of claim 1 comprising the processor further configured to:
   determine a nominal increment value associated with the write element; and
   increment the error scan counter based on the nominal increment value modified based on the amount of deviation.

3. The apparatus of claim 2 comprising the processor further configured to:
   modify the nominal increment value by a first amount if the amount of deviation indicates the write element deviated from the center line in a direction away from the area of the data storage medium proximate to the target track; and
   modify the nominal increment value by a second amount greater than the first amount if the amount of deviation indicates the write element deviated from the center line in a direction towards the area of the data storage medium proximate to the target track.

4. The apparatus of claim 2 comprising the processor further configured to:
   retrieve the nominal increment value from a table, the nominal increment value set based on testing performed on the write element.

5. The apparatus of claim 1 comprising the processor further configured to:
   determine a first value for an increment modifier if the amount of deviation does not exceed a first deviation threshold;
   determine a second value for the increment modifier if the amount of deviation exceeds the first deviation threshold;
   determine a third value for the increment modifier if the amount of deviation exceeds a second deviation threshold; and increment the error scan counter based on the increment modifier.

6. The apparatus of claim 1 comprising the processor further configured to:
   determine whether the error scan counter for the area exceeds an error scan threshold; and
   perform an error scan on the area when the error scan counter exceeds the error scan threshold.

7. The apparatus of claim 6 comprising the processor further configured to:
   determine whether a number of errors detected in the error scan exceeds an error threshold; and
   refresh data of the area when the number of errors exceeds the error threshold.

8. The apparatus of claim 1 further comprising the area includes a data track near the target track and influenced by the write operation to the target track.

9. The apparatus of claim 8 comprising the processor further configured to:
   determine the amount of deviation for multiple sections of the target track; and
   increment the error scan counter for the data track near the target track based on a section from the multiple sections with a highest deviation.

10. The apparatus of claim 1 comprising the processor further configured to:
    determine the amount of deviation based on a position error signal obtained from the target track.

11. A method comprising:
    maintain error scan counters for areas of a data storage medium to determine when to perform an error scan on the areas;
    performing a write operation to record data to a target track of a data storage medium using a write element;
    determining an amount of deviation of the write element from a center line of the target track; and
    incrementing an error scan counter for an area of the data storage medium proximate to the target track based on the amount of deviation.

12. The method of claim 11 further comprising:
    determining a nominal increment value associated with the write element; and
    incrementing the error scan counter based on the nominal increment value modified based on the amount of deviation.

13. The method of claim 12 further comprising:
    modifying the nominal increment value by a first amount if the amount of deviation indicates the write element deviated from the center line in a direction away from the area of the data storage medium proximate to the target track; and
    modifying the nominal increment value by a second amount greater than the first amount if the amount of deviation indicates the write element deviated from the center line in a direction towards the area of the data storage medium proximate to the target track.

14. The method of claim 11 further comprising:
    determining a first value for an increment modifier if the amount of deviation does not exceed a first deviation threshold;
    determining a second value for the increment modifier if the amount of deviation exceeds the first deviation threshold;
    determining a third value for the increment modifier if the amount of deviation exceeds a second deviation threshold; and
    incrementing the error scan counter based on the increment modifier.

15. The method of claim 11 further comprising:
    performing an error scan on the area when the error scan counter exceeds an error scan threshold; and
    refreshing data of the area when a number of errors detected in the error scan exceeds a specified error threshold.

16. A memory device storing instructions that, when executed, cause a processor to perform a method comprising:
    performing a write operation to record data to a target track of a data storage medium using a write element;
    determining an amount of deviation of the write element from a center line of the target track; and
    incrementing an error scan counter for an area of the data storage medium proximate to the target track based on the amount of deviation.

17. The memory device of claim 16, the method further comprising:
    incrementing the error scan counter based on a nominal increment value associated with the write element modified based on the amount of deviation;
    modifying a nominal increment value by a first amount if the amount of deviation indicates the write element deviated from the center line in a direction away from the area of the data storage medium proximate to the target track; and
    modifying the nominal increment value by a second amount greater than the first amount if the amount of deviation indicates the write element deviated from the center line in a direction towards the area of the data storage medium proximate to the target track.

18. The memory device of claim 16, the method further comprising:
    determining a first value for an increment modifier if the amount of deviation does not exceed a first deviation threshold;
    determining a second value for the increment modifier if the amount of deviation exceeds the first deviation threshold;
    determining a third value for the increment modifier if the amount of deviation exceeds a second deviation threshold; and
    incrementing the error scan counter based on the increment modifier.

19. The memory device of claim 16, the method further comprising:
    the area includes a data track near the target track and influenced by the write operation to the target track;
    determining the amount of deviation per section less than all of the target track; and
    incrementing the error scan counter for the data track near the target track based on a section of the target track with the highest deviation.

20. The memory device of claim 16, the method further comprising:
    determining a proximity of the write element to the area of the data storage medium based on the amount of deviation; and
    incrementing the error scan counter by an increasing value relative to the proximity of the write element to the area, including incrementing the error scan counter by a low value when the write element is distant from the area and incrementing the error scan counter by a high value when the write element is close to the area.

* * * * *